April 5, 1966  M. ROGALSKI ETAL  3,244,128
SUPPORTING STAND
Filed May 22, 1964  2 Sheets-Sheet 1
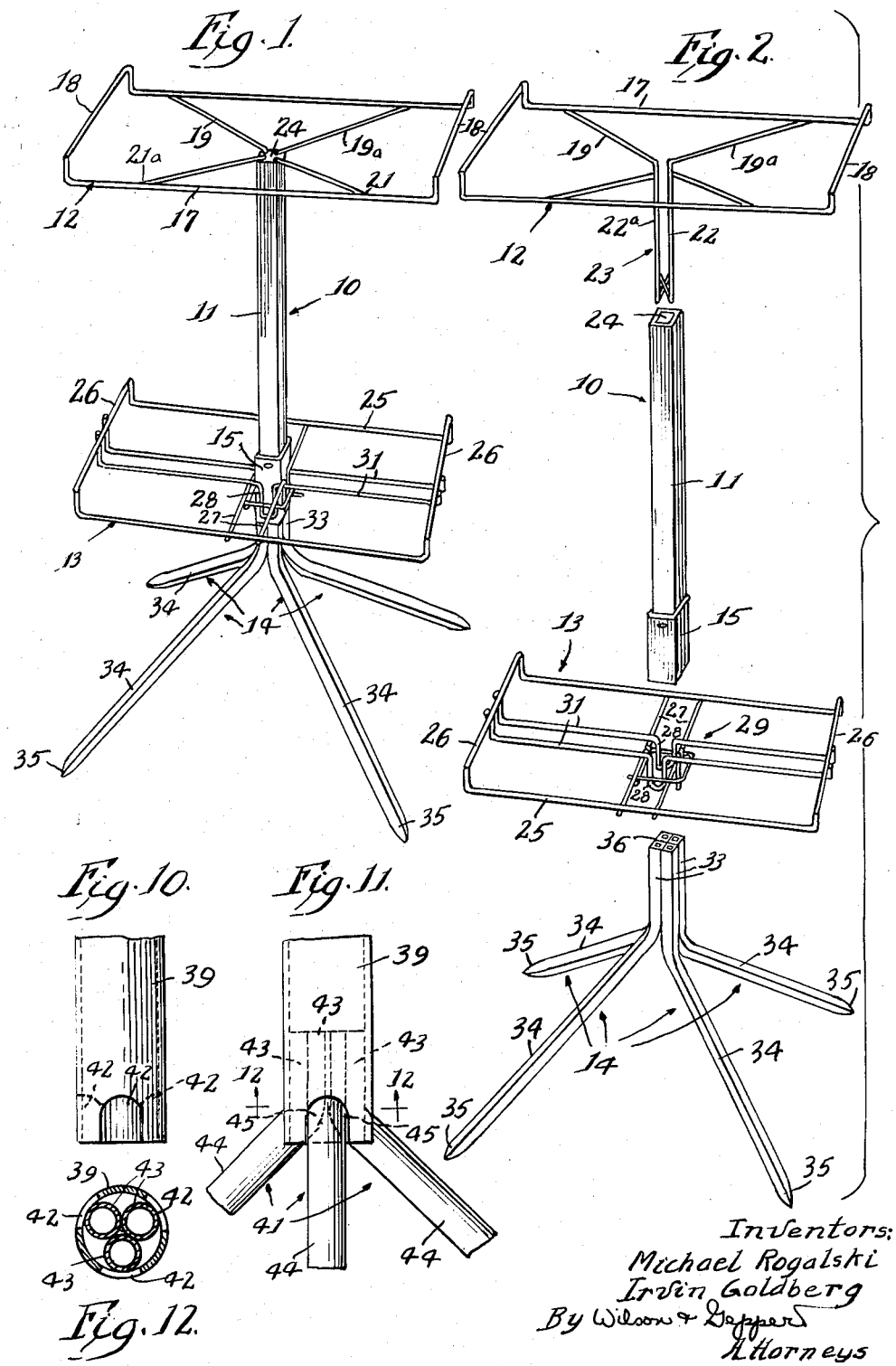

April 5, 1966   M. ROGALSKI ETAL   3,244,128
SUPPORTING STAND
Filed May 22, 1964   2 Sheets-Sheet 2
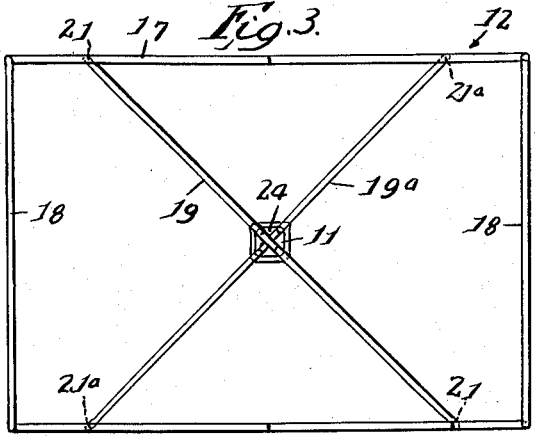
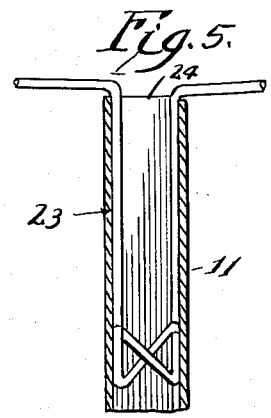
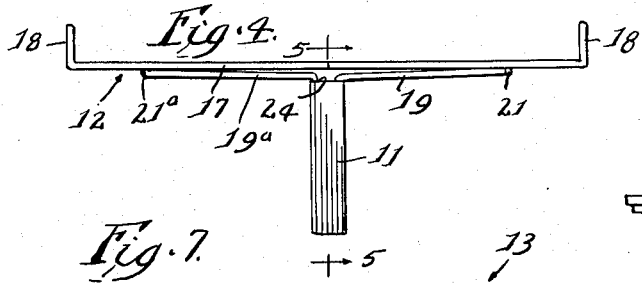
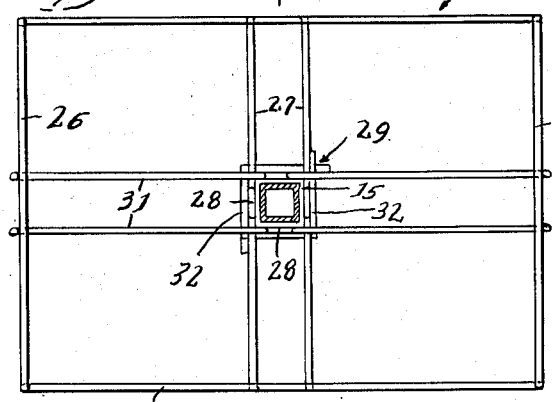
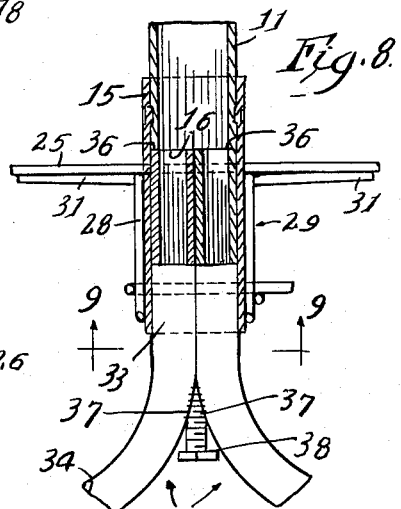
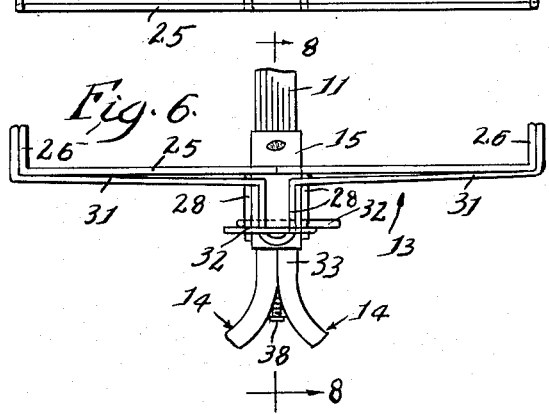
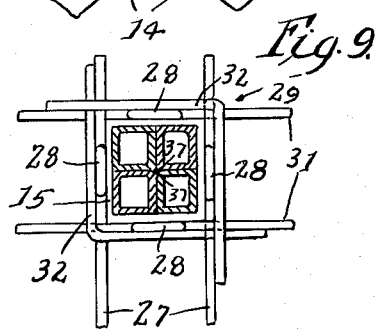
Inventors:
Michael Rogalski
Irvin Goldberg
By Wilson & Geppert
Attorneys United States Patent Office 3,244,128
Patented Apr. 5, 1966

3,244,128
SUPPORTING STAND
Michael Rogalski, Evergreen Park, and Irvin R. Goldberg, Bellwood, Ill., assignors to Rogal Tube Bending Company, Inc., Chicago, Ill., a corporation of Illinois
Filed May 22, 1964, Ser. No. 369,436
5 Claims. (Cl. 108—153)

The present invention relates to a supporting stand construction and more particularly to a novel stand or table having removably mounted supporting legs which are quickly and accurately aligned and positioned in the stand and secured in operative position in a novel manner.

An important object of the present invention is the provision of an easily and readily assembled supporting stand having a tubular center supporting post or pedestal, a plurality of removable legs conformably received and secured within the center post or pedestal and vertically spaced supporting platforms or frames which are detachably mounted on and readily removable from the post or pedestal. The legs are of similar contour so as to be interchangeable and of tubular form with the upper ends projecting vertically and therebelow suitably bent so that the lower ends of the legs will have a sufficient spread to afford stability and prevent tipping of the stand, the upper and inner ends of the legs received within the tubular member.

Another important object of the present invention is the provision of a supporting stand with a hollow tubular center post or pedestal having an internal shoulder for positioning and aligning the inner ends of the legs in the central post. The central tubular pedestal terminates at its lower end in a tubular encompassing sleeve which is secured to the lower end of the central pedestal. Thus, the end of the central pedestal within the sleeve provides a limiting shoulder against which abuts and locates the upper ends of the legs for the stand.

The present invention further comprehends the provision of a novel securing means to retain the plurality of legs together within the central tubular member or pedestal. This securing means is a screw which is inserted and wedged into the central space where the adjoining legs merge into abutting relation. The space between inner surfaces of the legs is adapted to receive therebetween an anchoring screw and, as the screw is inserted into position, the legs are cammed or wedged outwardly against the interior surface at the bottom of the sleeve, whereby the screw securely retains the legs within the sleeve.

The present invention also comprehends the provision of a horizontal supporting platform or frame mounted on the top of the central tubular member. The supporting platform is formed of wire bent to make a generally rectangular frame braced with generally diagonal cross pieces; the diagonal cross pieces each having a central depending U-bend which is adapted to depend into and frictionally fit within the open end of the central tubular member or pedestal to properly position the supporting platform on the stand. A second horizontal supporting frame is formed with a central opening so as to fractionally engage the outer surface of the sleeve and be positioned and retained thereon.

Further objects are to provide a construction of maximum simplicity, efficiency, economy and ease of assembly, and such further objects, advantages and capabilities as will later more fully appear and are inherently possessed thereby.

In the drawings:

FIGURE 1 is a perspective view of the assembled novel supporting stand of the present invention.

FIG. 2 is an exploded perspective view of the disassembled stand shown in FIG. 1 showing the various components or elements which when assembled form the stand.

FIG. 3 is a top plan view of the upper supporting frame and pedestal.

FIG. 4 is a partial front elevational view of the top of the assembly of FIG. 3.

FIG. 5 is a vertical cross sectional view taken on the line 5—5 of FIG. 4.

FIG. 6 is a partial front elevational view showing the lower portion of the central support member and sleeve, the lower supporting frame and the upper portion of the legs.

FIG. 7 is a top plan view of FIG. 6 but with the legs omitted.

FIG. 8 is an enlarged vertical cross sectional view taken on the line 8—8 of FIG. 6.

FIG. 9 is a horizontal cross sectional view taken on the line 9—9 of FIG. 8 and viewed in the direction of the arrows.

FIG. 10 is a partial front elevational view of an alternate embodiment of the central supporting member or pedestal of the stand.

FIG. 11 is a partial front elevational view similar to FIG. 10, but with the upper portions of the legs shown in assembled position.

FIG. 12 is a horizontal cross sectional view taken on the line 12—12 of FIG. 11.

Referring more particularly to the drawings wherein are disclosed the illustrative embodiments of the present invention, FIGS. 1 and 2 disclose a supporting stand 10 having a center post, column or pedestal 11 formed of square metal tubing with a top supporting frame or shelf 12, a bottom supporting frame or shelf 13 and a plurality of legs 14 formed of tubular metal stock or square cross section. The center post or column 11 is open at both ends and a short tubular metal sleeve 15 receives and is secured to the lower end of the post 11, the lower end of the post 11 forming a limiting or abutting shoulder 16 within the encompassing sleeve 15 (see FIG. 8).

The upper supporting surface or shelf 12 is formed as a rectangular wire frame 17 with upturned confining end portions 18 (FIGS. 1, 2, 3 and 4). A pair of generally diagonal wire members 19, 19a are secured at their ends 21, 21a to the wire frame 17 and extend thereacross to form cross braces with the central portion 22, 22a of each diagonal member formed into a depending generally U-shaped configuration (FIGS. 2 and 5) to form an anchoring projection with the member crossing at the lower end of the U-shaped portions. These U-shaped portions form a depending projection 23 adapted to be frictionally received within the upper open end 24 of the center post to retain the shelf on the stand.

The lower supporting surface or shelf 13 is also formed of a generally rectangular wire frame 25 having upturned confining ends 26. A pair of parallel wire strands or rods 27 extend across the frame 25 between the opposite sides thereof with the wires adapted to pass on opposite sides of the sleeve 15. The wire strands 27 each have a central depending U-shaped portion 28 (FIGS. 1, 2 and 6) forming part of the square central portion 29 frictionally engaging the sleeve 15. A second pair of wire strands 31 extend across the frame between the ends 26 (FIGS. 1, 2, 7 and 8) and have the U-shaped portions 28 forming part of the central portion 29. Also forming a part of the frame 29 are a pair of oppositely disposed right angle short wire strands or rods 32 spaced below the strands 27 and 31 and suitably secured to the U-shaped portions 28 as by brazing or welding (FIGS. 2, 6, 8 and 9).

At the lower end of the sleeve 15 are a plurality of supporting legs 14, four in number in the embodiment of FIGS. 1 to 9, which are formed of square tubular stock. Each leg includes a short vertical or upright portion 33 adapted to be inserted into the sleeve 15 and a relatively long angularly arranged portion 34 with the long portion terminating in a floor contacting end 35. The four legs 14 have their upright portions 33 in abutting relation and conformably received in the tubular sleeve 15 with the upper end 36 of each upright portion 33 in contacting and abutting relation with the limiting shoulder 16 (FIG. 8) to properly align and position the legs 14 on the center post 11 with the lower ends 35 of the legs generally equally spaced and sufficiently widespread to form a stable base for supporting the stand.

The curved inner portion 37 of each leg 14 adjoining the other three legs 14 (FIGS. 6 and 8) is spaced only sufficiently to receive a screw 38 inserted into the central space between the legs to spread and retain the legs assembled within the sleeve 15. Not only is there the threaded engagement between the screw and the legs, but also, the screw cams or wedges the legs outwardly so that the upright portions 33 within the sleeve frictionally engage the interior surface of the sleeve 15 to prevent accidental or unintentional disassembly thereof.

FIGS. 10 through 12 disclose a second embodiment of the present invention wherein round or cylindrical tubular metal stock is utilized for the stand. A center post or column 39 is formed of a piece of tubular stock having a relatively large diameter and the legs 41 are formed of smaller diameter stock. The center post 39 may be provided with suitable similar upper and lower shelves or platforms (not shown), but a short sleeve similar to the sleeve 15 is not necessary in this embodiment. The lower open end of the post 39 is provided with three equispaced inverted generally U-shaped slots 42; each slot having a width substantially equal to the maximum diameter of a leg 41. The legs 41 have a short upright portion 43 and a relatively long angularly arranged portion 44 providing the supporting leg portions.

The upright portion 43 of each leg 41 is inserted into the open lower end of the center post 39 with the bend 45 of the longer leg portion being received in one of the slots 42. The slots align and also limit the distance which the leg may be inserted into the post 11 and also provide a generally equidistant spread between the floor engaging ends of the legs to provide a stable base for the stand. The legs are prevented from twisting or rotating by engagement with the edges of the slot. As in the previous embodiment, a screw (not shown) is utilized for threaded engagement with and spreading the legs 41 in the same manner as shown in FIGS. 6 and 8 and thereby retain the legs in the center post 39.

Having disclosed the invention, we claim:

1. A supporting stand comprising a center tubular post open at each end, a short sleeve receiving and secured to the lower end of said center post, a shoulder on the inferior surface of the sleeve formed by the lower end of said center post, a plurality of separate legs each having a relatively long and angularly arranged supporting portion and a relatively short upright portion, said short upright portion of each leg received within said sleeve and abutting said shoulder, said center post, sleeve and legs all being formed of square tubular stock, a screw threadingly engaging the adjoining inner surfaces of the upright portions of said legs and wedging the legs outwardly to frictionally retain the legs within said sleeve, and at least one supporting shelf frictionally mounted on said center post.

2. A supporting stand as set forth in claim 1, in which the supporting shelf includes a supporting surface having a generally rectangular wire frame with upturned ends and a pair of crossed generally diagonal wire members, each diagonal member having a central U-shaped depending portion received within the upper open end of the center post.

3. A supporting stand as set forth in claim 2, including a second shelf spaced from said supporting shelf and frictionally held on the sleeve, said second shelf comprising a supporting surface having a generally rectangular wire frame with upturned ends, and a pair of parallel wire strands extending across each pair of opposite sides of the frame and intersecting at the center of the frame to form a square, each strand within the square having a U-shaped depending portion to frictionally engage the sleeve.

4. A supporting stand comprising a center tubular post open at both ends, said lower end having at least three equispaced U-shaped slots therein opening at the lower edge of the post and at least three separate legs each having a relatively long supporting leg portion angularly disposed and a relatively short upright portion received with the center post, each long and short portion joined by a curved portion received in one of the open-ended slots to limit the depth of penetration of and align the short upright portions in the center post and to position the long supporting leg portions to form a stable base, said legs and center post being formed of tubular metal stock.

5. A supporting stand as set forth in claim 4, including a screw threadingly engaging the central curved adjoining surfaces of the legs adjacent their upright portions to frictionally retain the legs within the center post, and at least one horizontal supporting platform mounted on the center post.

References Cited by the Examiner

UNITED STATES PATENTS

| | | | |
|---|---|---|---|
| D. 190,107 | 4/1961 | Glaser | 211—133 X |
| 933,142 | 9/1909 | Voght | 248—165 X |
| 1,015,183 | 1/1912 | Hering | 248—165 |
| 1,754,998 | 4/1930 | Geartts | 211—133 X |
| 1,930,742 | 10/1933 | De Saussure | 108—150 |
| 1,997,660 | 4/1935 | Smith | 108—154 X |
| 2,632,568 | 3/1953 | Abt | 211—133 X |
| 2,789,873 | 4/1957 | Gonder | 211—133 |
| 3,141,557 | 7/1964 | Marschak | 248—165 X |
| 3,164,347 | 1/1965 | McMasters | 248—188.1 X |

FOREIGN PATENTS

| | | |
|---|---|---|
| 1,317,222 | 1/1963 | France. |
| 1,329,026 | 4/1963 | France. |
| 214,911 | 10/1909 | Germany. |
| 445,793 | 6/1927 | Germany. |

FRANK B. SHERRY, *Primary Examiner.*

J. T. McCALL, *Assistant Examiner.*